United States Patent
Boczar et al.

(10) Patent No.: US 7,644,893 B2
(45) Date of Patent: Jan. 12, 2010

(54) FULL AUTHORITY FLY-BY-WIRE PEDAL SYSTEM

(75) Inventors: Bruce Boczar, Seymour, CT (US); Lorren Stiles, Palm City, FL (US); Peter T. Witiak, Shelton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 723 days.

(21) Appl. No.: 11/354,687

(22) Filed: Feb. 15, 2006

(65) Prior Publication Data

US 2007/0205333 A1 Sep. 6, 2007

(51) Int. Cl.
*B64C 19/02* (2006.01)

(52) U.S. Cl. ...................... 244/235; 244/220

(58) Field of Classification Search ................. 244/220, 244/221, 223, 227, 228, 235
See application file for complete search history.

(56) References Cited

U.S. PATENT DOCUMENTS

| | | | | |
|---|---|---|---|---|
| 3,733,039 A * | 5/1973 | O'Connor et al. ........... 244/181 |
| 3,747,876 A * | 7/1973 | Fortna et al. ................ 244/223 |
| 4,206,891 A * | 6/1980 | Perez et al. .............. 244/17.13 |
| 4,345,195 A * | 8/1982 | Griffith et al. ............... 318/628 |
| 4,529,155 A | 7/1985 | Bramwell et al. |
| 4,531,692 A | 7/1985 | Mateus |
| 5,131,604 A | 7/1992 | Yoerkie, Jr. et al. |
| 5,149,023 A * | 9/1992 | Sakurai et al. .............. 244/229 |
| 5,601,257 A | 2/1997 | McKann |
| 5,607,122 A | 3/1997 | Hicks et al. |
| 5,738,310 A | 4/1998 | Rollet et al. |
| 5,746,398 A * | 5/1998 | Rollet et al. ................. 244/223 |
| 5,868,359 A * | 2/1999 | Cartmell et al. ............. 244/223 |
| 5,878,981 A * | 3/1999 | Dewey ....................... 244/190 |
| 6,053,452 A | 4/2000 | Yamakawa et al. |
| 6,128,554 A * | 10/2000 | Damotte ........................ 701/4 |
| 6,142,413 A | 11/2000 | Dequin et al. |
| 6,254,037 B1 * | 7/2001 | Fenny et al. ................. 244/223 |
| 6,338,454 B1 | 1/2002 | Rollet et al. |
| 6,416,015 B1 | 7/2002 | Carson |
| 6,526,338 B2 * | 2/2003 | Kubica et al. .................. 701/4 |
| 6,644,600 B1 * | 11/2003 | Olson et al. ................. 244/221 |
| 6,755,374 B1 | 6/2004 | Carson |
| 2004/0259687 A1 * | 12/2004 | Ritter et al. ................. 477/187 |
| 2005/0204855 A1 * | 9/2005 | Fujiwara et al. ............... 74/512 |
| 2005/0235820 A1 * | 10/2005 | Fujiwara et al. ............ 91/369.2 |
| 2007/0112473 A1 * | 5/2007 | Ueno et al. .................... 701/1 |

* cited by examiner

*Primary Examiner*—Michael R Mansen
*Assistant Examiner*—Joseph W Sanderson
(74) *Attorney, Agent, or Firm*—Carlson, Gaskey & Olds PC

(57) ABSTRACT

A pedal system particularly tailored to a Fly-By-Wire (FBW) flight control system includes a double gradient linkage assembly. The double gradient linkage assembly includes a damper system and a spring system that improves yaw axis (azimuth) control of the aircraft. Control is only required when a change in the yaw axis state is demanded. Since only minimal displacement inputs to such a FBW flight control system is required, the travel of the pedals are exceeding compact, such that pilot workload is significantly reduced through the reduction in the frequency and magnitude of aircraft control inputs.

14 Claims, 6 Drawing Sheets

FULL AUTHORITY FLY-BY-WIRE PEDAL SYSTEM

BACKGROUND OF THE INVENTION

The present invention relates to an anti-torque tail rotor system, and more particularly to a small displacement pedal system for a full authority Fly-By-Wire (FBW) flight control system.

The majority of helicopters utilize a single main rotor assembly and an anti-torque tail rotor assembly. The tail rotor assembly has proven to be efficient and reliable for providing lateral thrust to counteract induced torque generated by the main rotor assembly and to provide yaw directional control of the helicopter in hover, transitional, low, and high speed flight regimes.

Control of the anti-torque tail rotor assembly is conventionally achieved through a relatively large displacement pedal system which provides control proportional to pedal displacement. The pilot must typically constantly manipulate the pedals to coordinate changes in power, bank angle or speed. This may significantly increase pilot workload.

When an autopilot is incorporated, the pedal position is synchronized to the autopilot which results in frequent movement of the pedals. As the pedals are often utilized as footrests to stabilize the pilot, autopilot movement of the pedals may be uncomfortable or otherwise distracting.

Fly By Wire (FBW) flight control systems are emerging as state of the art in control of rotary-wing aircraft. FBW permits a wide range of improvements that contribute to pilot workload reductions. FBW pedal systems have heretofore only translated the relatively large displacement of the pedals into digital commands which provide yaw directional control. Although significant benefits are realized with FBW flight control systems, conventional relatively large displacement FBW pedal systems have not utilized FBW flight control systems to full advantage as the pedal system remains essentially conventional.

Accordingly, it is desirable to provide a Fly-By-Wire (FBW) pedal system for an anti-torque tail rotor system which is integrated with a full authority FBW flight control system to reduce pilot workload and thereby lead to a more capable aircraft.

SUMMARY OF THE INVENTION

A pedal system particularly tailored for a Fly-By-Wire (FBW) flight control system according to the present invention includes a double gradient linkage assembly. The double gradient linkage assembly includes a spring system and a damper system to provide a double gradient force feeling to the pedal dynamics of the pedals.

The double gradient force feeling improves yaw axis (azimuth) control of the aircraft by significantly reducing the workload for the pilot because control is only required when a change in the yaw axis state is demanded. At all other times the pilot relaxes input on the pedals and the FBW flight control system provides the required stability and coordination.

Since only minimal displacement inputs are required for such a pedal system, the travel of the pedals may be exceeding compact, preferably on the order of +/−1.25 inches of travel. Pilot workload is thereby significantly reduced through reduction in both the frequency and magnitude of aircraft control inputs. Applicant has determined that to take full advantage of such minimal travel requires the pedal system to have a double gradient force feeling which provides a centering force to facilitate aircraft/pilot integration. More specifically, the double gradient force feeling provides approximately 40 lbs/in for the first 0.2 inches of the 1.25 inches of pedal travel then reduces to approximately 20 lbs/in.

The pedal system is of reduced system weight as the mechanisms between the pilot and control servos are eliminated as well as the mechanical interconnections between the pilot's stations. The pedal system also simplifies the mechanical design which reduces parts count and increases reliability. Furthermore, the flight control system is reduced in complexity as the need for trim modules which would normally position the pedals according to a proportional flight control feedback system may be eliminated.

The present invention therefore provides a Fly-By-Wire (FBW) pedal system for an anti-torque tail rotor system which is integrated with a full authority FBW flight control system to reduce pilot workload and thereby lead to a more capable aircraft.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
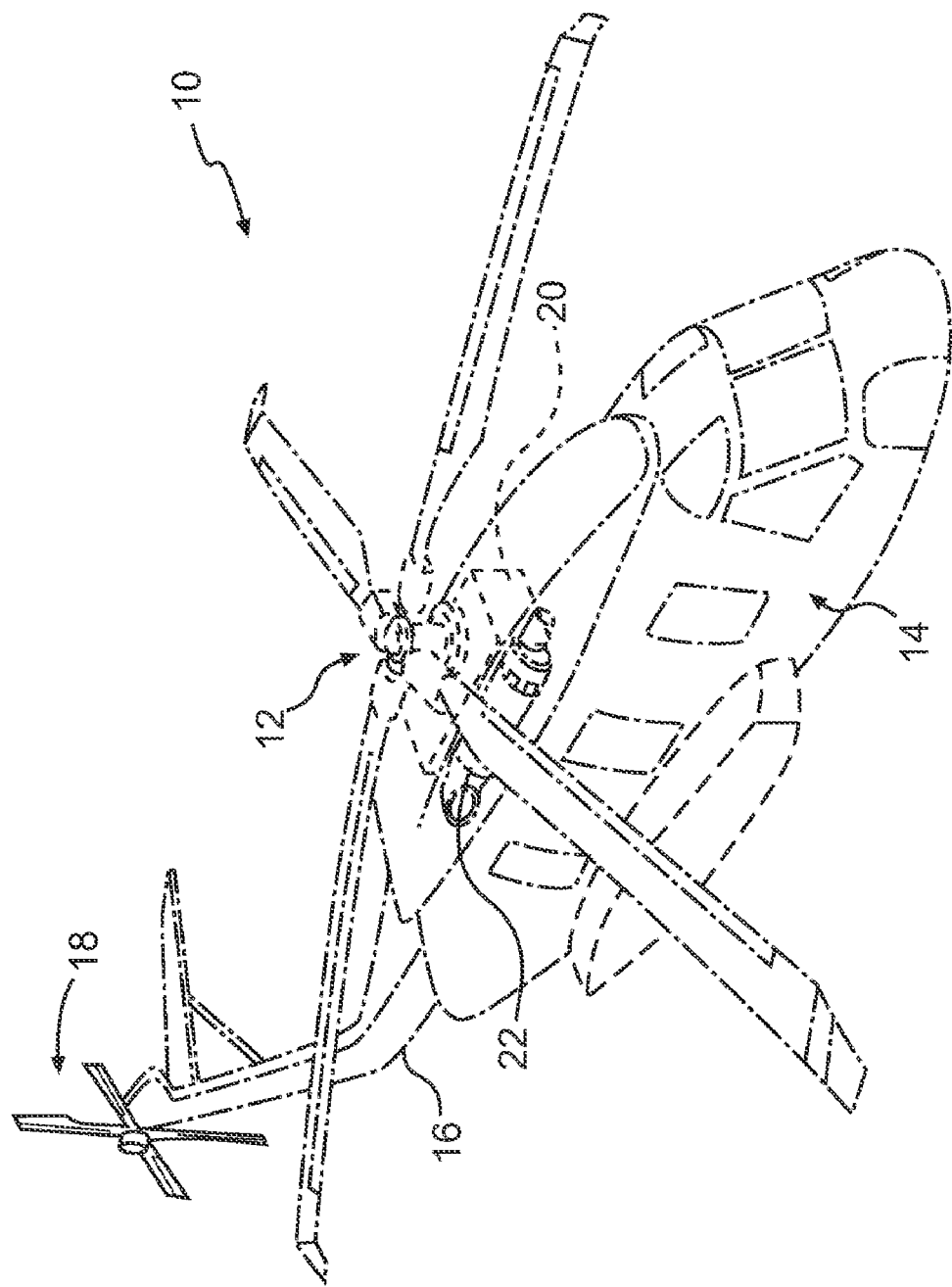
FIG. 1 is a general perspective view an exemplary rotary wing aircraft embodiment for use with the present invention.

FIG. 1 schematically illustrates a rotary-wing aircraft 10 having a main rotor assembly 12. The aircraft 10 includes an airframe 14 having an extending tail 16 which mounts an anti-torque tail rotor system 18. The main rotor assembly 12 and the anti-torque tail rotor system 18 are driven through a transmission (illustrated schematically at 20) by one or more engines (illustrated schematically at 22). Although a particular helicopter configuration is illustrated in the disclosed embodiment, other anti-torque systems such as ducted fans and propulsors will also benefit from the present invention.

Figure 2:
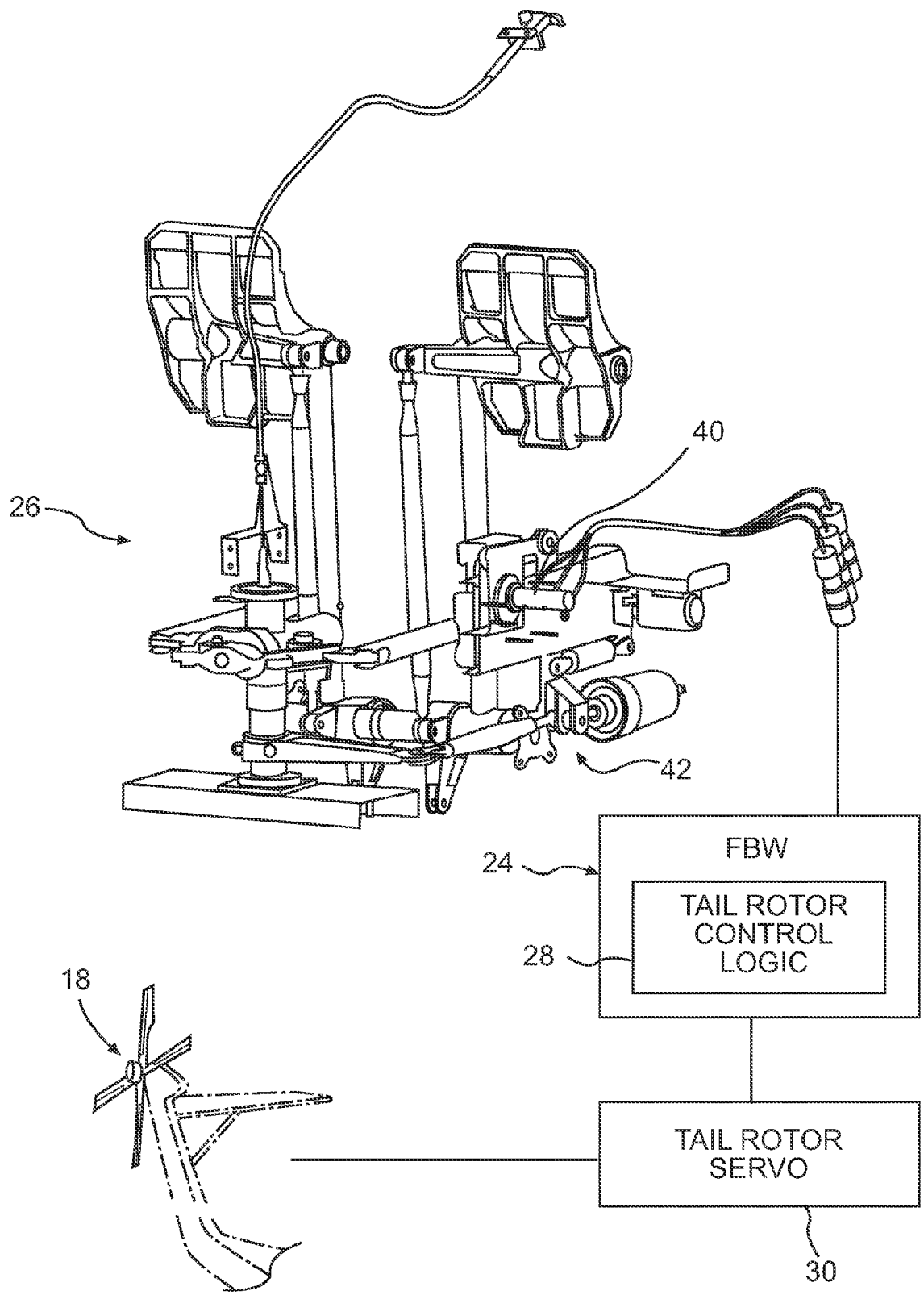
FIG. 2 is a block diagram of the anti-torque tail rotor system.

Referring to FIG. 2, the anti-torque tail rotor system 18 is driven through an aircraft flight control system 24. The aircraft flight control system 24 is preferably a full authority Fly-By-Wire (FBW) flight control system 24 that utilizes signals to convey pilot intentions to the flight control servos. In the FBW flight control system 24, a pilot provides input through FBW yaw flight control logic 28 and thence the anti-torque tail rotor system 18. Preferably, the FBW control system 24 requires control input only when a change in the yaw axis state is demanded. That is, the FBW control system 24 may be described as a "command response hold system."

The pilot's input is input to the FBW flight control system 24 through an interface such as a pedal system 26. Since the anti-torque tail rotor system 18 is controlled through the FBW flight control system 24, the pedal system 26 need not be mechanically linked to the anti-torque tail rotor system 18. The pilot's input is communicated through the FBW yaw flight control logic 28 to drive, for example only, a tail rotor drive servo 30 which controls the pitch of the anti-torque tail rotor system 18. The FBW yaw flight control logic 28 typically utilizes aircraft rate and attitude response feedback directly so as to modify the pilot's input to yaw the aircraft 10 at a commanded rate and actively control the aircraft's response. As generally understood, FBW flight control systems may provide such feedback mechanisms utilizing linear control system logic, such as proportional, integral, or derivative (PID) paths to achieve a desired response and to compensate for undesired destabilization forces acting on the aircraft in the particular axis. It should be understood that the FBW control logic theory may be incorporated through a multiple of flight control systems.

Figure 3:
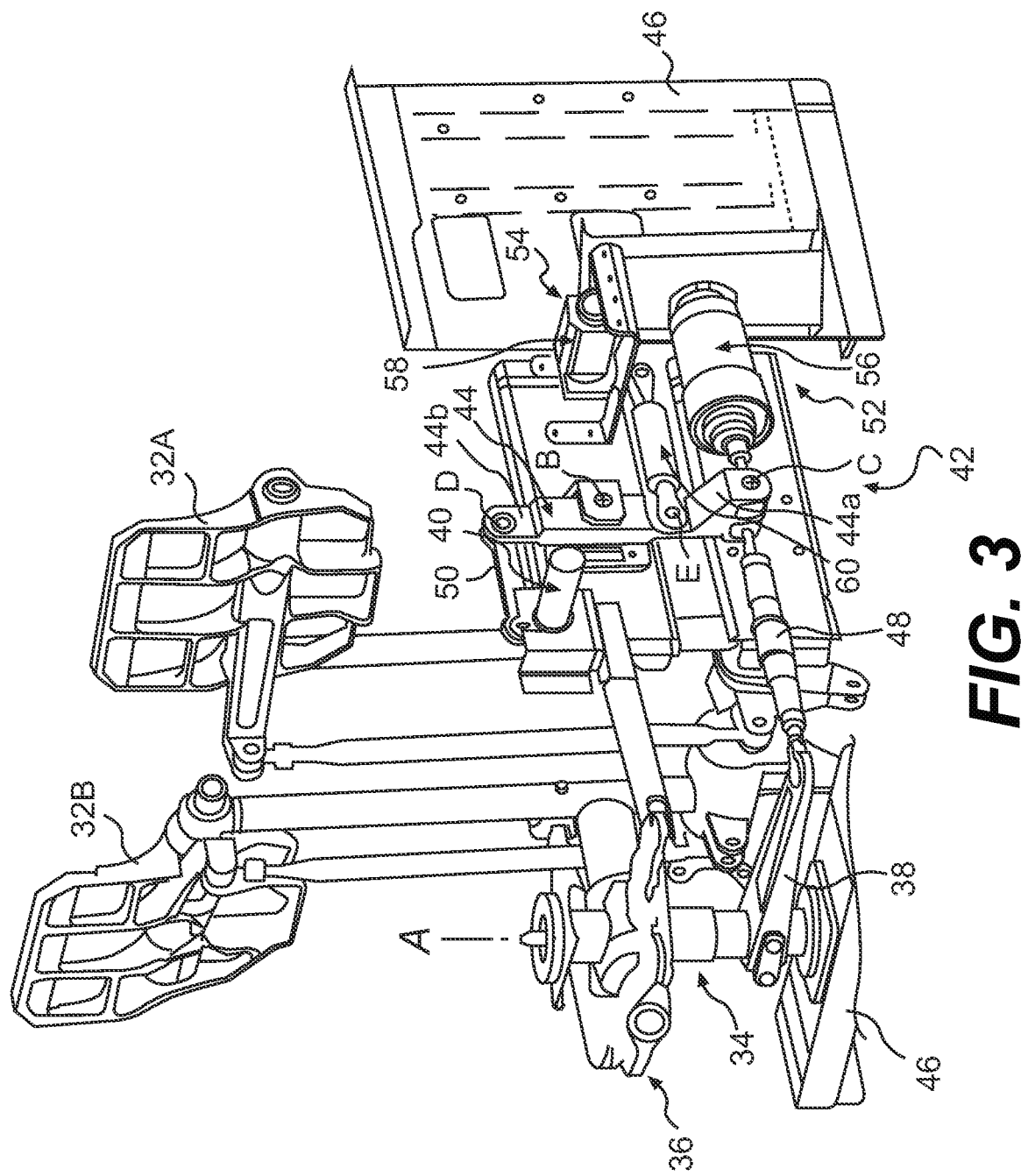
FIG. 3 is a perspective view of a pedal system according to the present invention.

Referring to FIG. 3, the pedal system 26 is particularly tailored for the FBW flight control system 24. The pedal system 26 generally includes a relatively short travel port pedal 32A and starboard pedal 32B which are linked to a support structure 34 through a crank assembly 36. Pressure on the port pedal 32A rotates the crank assembly 36 about a support axis A and translates the starboard pedal 32B toward the pilot and vice-versa.

An actuator arm 38 is mounted to the crank assembly 36 for rotation about axis A therewith. The actuator arm 38 mechanically communicates motion of the pedals 32A, 32B to a fly-by-wire input 40 such as a Rotational Variable Differential Transformer (RVDT) through a double gradient linkage assembly 42.

The double gradient linkage assembly 42 includes a main pivot crank 44 which is pivotally mounted to fixed structure 46 for pivotal motion about an axis B. A main pushrod 48 links the actuator arm 38 to the main pivot crank 44 adjacent one end segment 44a at an axis C. A pushrod 50 links the actuator arm 38 to the fly-by-wire input 40 adjacent an end segment 44b at an axis D opposite end segment 44a. Inputs to the pedals 32A, 32B thereby pivot the main pivot crank 44 to drive the fly-by-wire input 40 and provide communication with the FBW control system 24 (also see FIG. 2).

Figure 4:
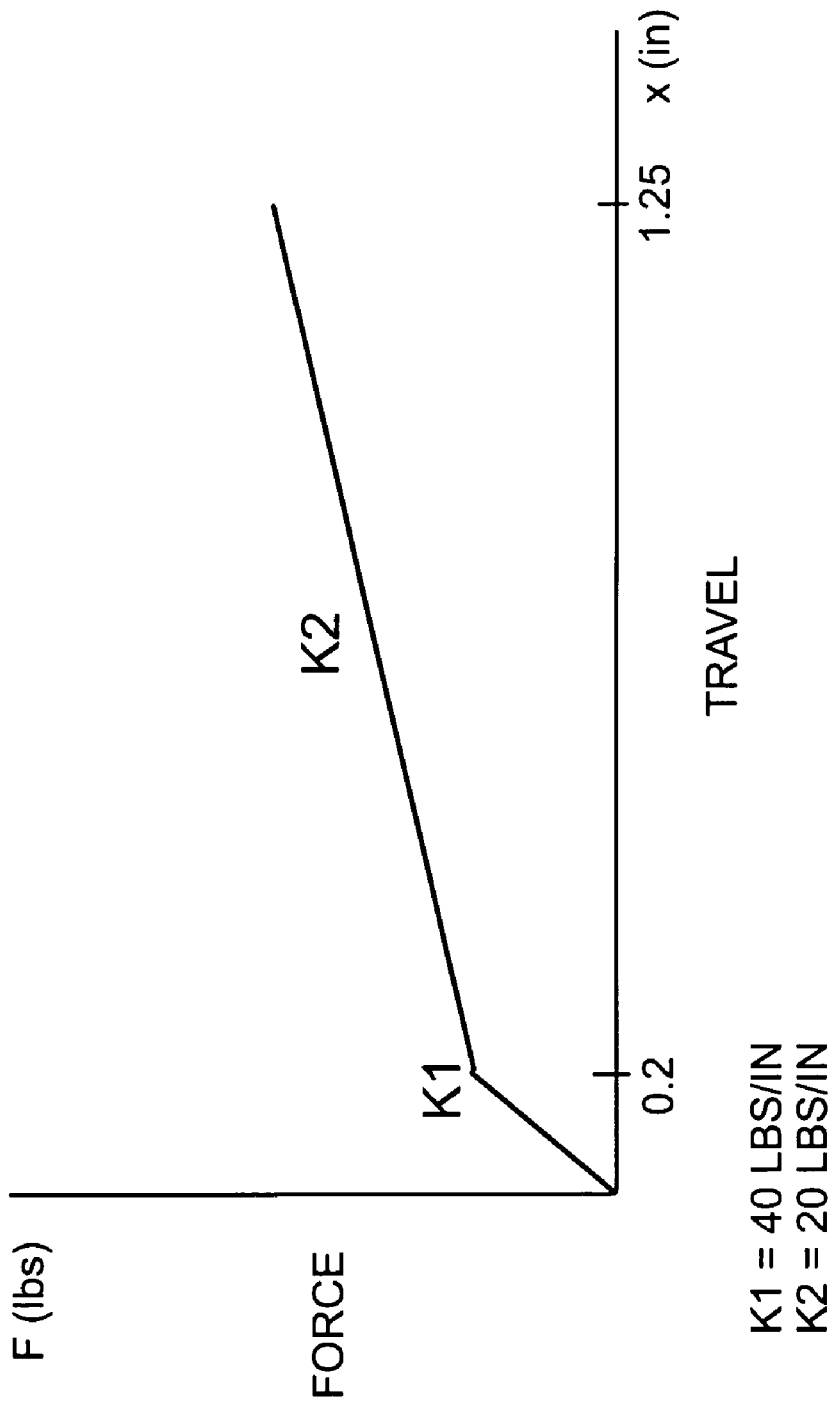
FIG. 4 is a schematic representation of a double gradient force feeling to the pedal dynamics provided by the pedals according to the present invention.

The double gradient linkage assembly 42 includes a spring system 52 and a damper system 54 to provide a double gradient force feeling to the pedal dynamics of pedals 32A, 32B (FIG. 4). It should be understood that various mass-spring-damper systems will be usable with the present invention.

The spring system 52 preferably includes a spring capsule 56 attached to the main pivot crank 44 at a pivot defined along axis C. The spring capsule 56 is mounted to the fixed structure 46.

The damper system 54 preferably includes a viscous damper 58 which is mounted to the main pivot crank 44 through a damper pushrod 60. The viscous damper 58 is mounted to the fixed structure 46 and the damper pushrod 60 is pivotally mounted to the main pivot crank 44 at a pivot defined by an axis E. Axis E is preferably longitudinally located on the main pivot crank 44 between axes B and C.

The double gradient linkage assembly 42 provide a double gradient force feel to the pedal dynamics (FIG. 4) of the pedals 32A, 32B. The double gradient force feeling improves yaw axis (azimuth) control of the aircraft by significantly reducing the workload for the pilot because control is only required when a change in the yaw axis state is demanded. At all other times the pilot relaxes input on the pedals and the FBW flight control system 24 provides all required stability and coordination. Thus there is no need for the pilot to continually adjust the pedal position for changing flight conditions, as is required in a conventional control implementation. This reduces pilot workload because the pedal is always in the same location unless maneuvering as contrasted with a conventional control system in which the pedals may migrate to various positions due to changing airspeed and/or power since airspeed affects pedal position in response to anti-torque requirements being consumed by the vertical tail surfaces.

Figure 5A:
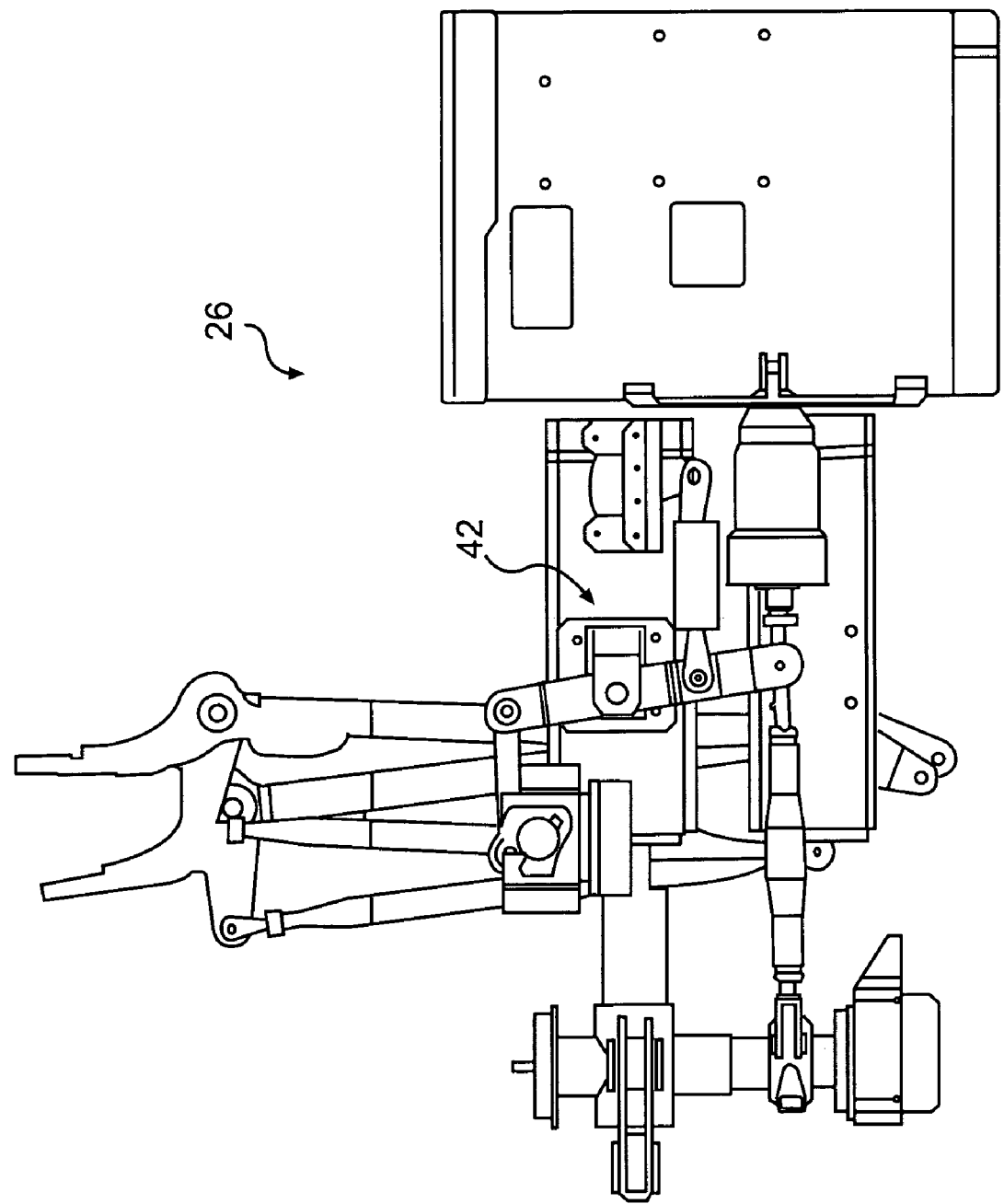
FIG. 5A is a perspective view of a pedal system in a first position.
Figure 5B:
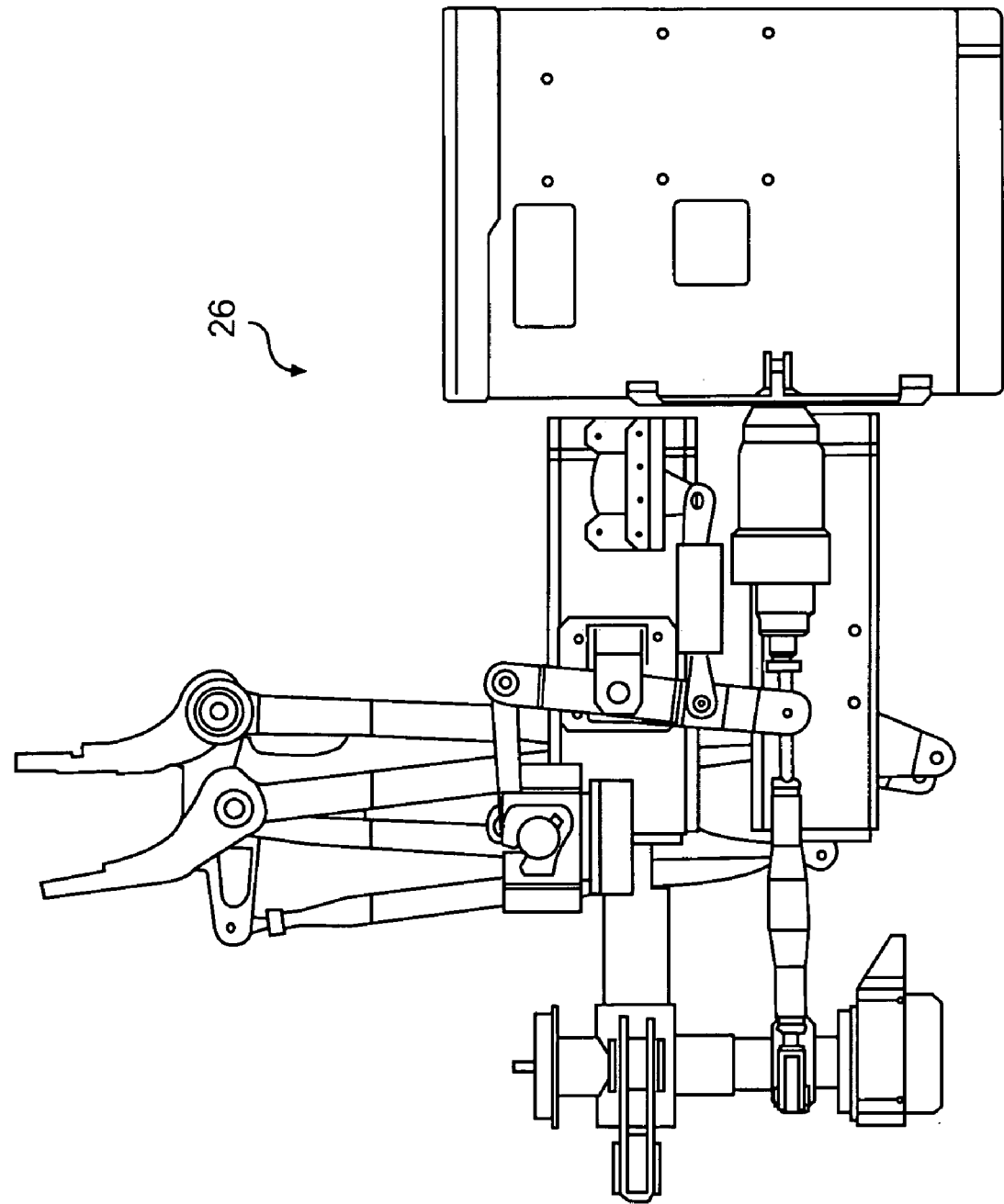
FIG. 5B is a perspective view of a pedal system in a second position.

Since only minimal displacement inputs to such a FBW flight control system 24 is required, the travel of the pedals 32A, 32B may be exceeding compact. Pedal travel is on the order of +/−1.25 inches (FIGS. 5A, 5B) such that pilot workload is significantly reduced through the reduction in both the frequency and magnitude of aircraft control inputs as compared to conventional related, large displaced pedals. Applicant has determined that to take full advantage of such minimal travel capabilities requires the double gradient force feeling provide a centering force which facilitate aircraft/pilot integration. That is, the double gradient force feeling permits the pedals 32A, 32B to essentially "snap" toward center. More specifically, the double gradient force feeling in the disclosed embodiment provides approximately 40 lbs/in for the first 0.2 inches of the 1.25 inches of pedal travel then reduces to approximately 20 lbs/in.

The pedal system 26 is also of reduced weight as the conventional linkage mechanisms between the pilot and control servos are eliminated as well as the mechanical interconnections between the pilot's stations. The pedal system 26 also simplifies the mechanical design which reduces parts count and thereby increases reliability. Furthermore, the flight control system is reduced in complexity as the need for trim modules which would normally position the pedals according to a proportional flight control feedback system may be eliminated.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotary-wing aircraft comprising:
   an anti-torque tail rotor system;
   a Fly-By-Wire flight control system in communication with said anti-torque tail rotor system; and
   a pedal system in communication with said Fly-By-Wire flight control system to control said anti-torque tail rotor system, said pedal system including a double gradient linkage assembly to provide a double gradient force feedback pedal dynamic.

2. The rotary-wing aircraft as recited in claim 1, wherein said double gradient linkage assembly provides a first resistance over a first travel of said pedal system and a second resistance over a second travel of said pedal system, said first resistance greater than said second resistance.

3. The rotary-wing aircraft as recited in claim 2, wherein said first resistance increases in a linear manner for said first travel of said pedal system and said second resistance increases linearly subsequent to said first resistance, said second resistance defining a slope less than a slope defined by said first resistance.

4. The rotary-wing aircraft as recited in claim 1, wherein said pedal system is in communication with said Fly-By-Wire flight control system through a Rotational Variable Differential Transformer.

5. The rotary-wing aircraft as recited in claim 1, wherein said pedal system includes a port pedal and starboard pedal linked to a support structure through a crank assembly, said crank assembly pivotable relative said support structure about a support axis.

6. The rotary-wing aircraft as recited in claim 5, further comprising a pushrod attached between said crank assembly and a main pivot crank of said double gradient linkage assembly, said main pivot crank pivotable about a pivot axis non-parallel to said support axis.

7. The rotary-wing aircraft as recited in claim 6, wherein said pushrod is pivotally mounted to said main pivot cranik adjacent an end segment thereof about a pushrod axis.

8. The rotary-wing aircraft as recited in claim 7, further comprising a spring system connected between said main pivot crank and a fixed structure, said spring system pivotally attached to said main pivot crank along said pushrod axis.

9. The rotary-wing aircraft as recited in claim 8, further comprising a damper system connected between said main pivot crank and said fixed structure, said damper system pivotally attached to said main pivot crank at a damper pivot axis longitudinally located between said pivot axis and said pushrod axis.

10. The rotary-wing aircraft as recited in claim 6, further comprising a fly-by-wire input to said fly-by-wire flight control system, said fly-by-wire input pivotally connected to an end segment of said main pivot crank at an input axis opposite said pushrod axis.

11. The rotary-wing aircraft as recited in claim 1, wherein said double gradient linkage assembly provides a first resistance of approximately 40 lbs. per inch for the first 0.2 inches of a travel of said pedal system and a second resistance of approximately 20 lbs. per inch over the remainder of the pedal travel.

12. The rotary-wing aircraft as recited in claim 11, wherein a total pedal travel of said pedal system is approximately +/−1.25 inches.

13. The rotary-wing aircraft as recited in claim 1, wherein said pedal system includes a spring system and a damper system to provide said double gradient pedal dynamic.

14. The rotary-wing aircraft as recited in claim 1, wherein said double gradient linkage assembly provides a centering force to said pedal system.

* * * * *